March 30, 1965   J. H. AUER, JR   3,176,266
VEHICULAR TRAFFIC DETECTION SYSTEM
Filed Aug. 12, 1960   4 Sheets-Sheet 1

A. PLATE OF TUBE 25
B. PLATE OF TUBE 26
C. GRID OF TUBE 31
D. PLATE OF TUBE 31
E. POINT "E"
F. GRID OF TUBE 64
G. GRID OF TUBE 65
H. PLATE OF TUBE 71
J. CATHODES OF TUBES 70 & 71

INVENTOR.
J. H. AUER JR.
BY Forest B. Hitchcock
HIS ATTORNEY

March 30, 1965   J. H. AUER, JR   3,176,266
VEHICULAR TRAFFIC DETECTION SYSTEM
Filed Aug. 12, 1960   4 Sheets-Sheet 2

INVENTOR.
J. H. AUER JR
BY
HIS ATTORNEY

March 30, 1965  J. H. AUER, JR  3,176,266
VEHICULAR TRAFFIC DETECTION SYSTEM
Filed Aug. 12, 1960  4 Sheets-Sheet 3
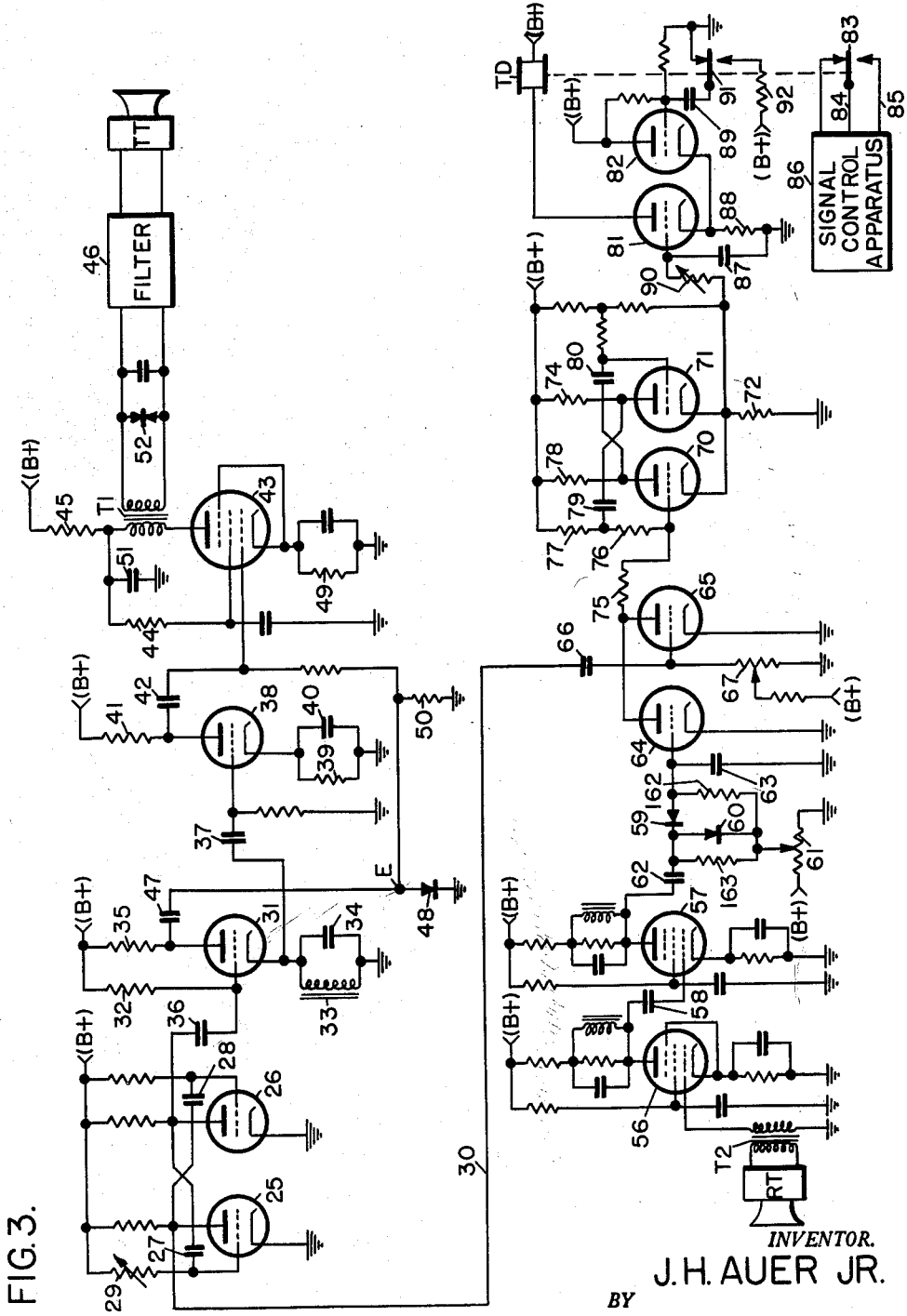
FIG.3.
INVENTOR.
J. H. AUER JR.
BY
HIS ATTORNEY March 30, 1965     J. H. AUER, JR     3,176,266

VEHICULAR TRAFFIC DETECTION SYSTEM

Filed Aug. 12, 1960     4 Sheets–Sheet 4

INVENTOR.
J. H. AUER JR.
BY
HIS ATTORNEY

United States Patent Office 3,176,266
Patented Mar. 30, 1965

3,176,266
VEHICULAR TRAFFIC DETECTION SYSTEM
John H. Auer, Jr., Rochester, N.Y., assignor to General Signal Corporation, a corporation of New York
Filed Aug. 12, 1960, Ser. No. 49,294
18 Claims. (Cl. 340—38)

This invention relates to the detection of vehicles, and more particularly pertains to a system for detecting the presence of vehicular traffic moving through a detection zone as opposed to a system wherein accurate registration of each individual passing vehicle is required.

In the copending application of H. C. Kendall et al., Ser. No. 808,736, filed April 24, 1959, now U.S. Patent No. 3,042,303, we have disclosed a system for the registration of objects and particularly vehicles in a manner that provides an extremely accurate count and where the system is particularly organized, for example, to prevent a single vehicle from being counted more than once. In this prior application, a beam of repetitive sound pulses is transmitted across the path of the vehicles in such a manner that it will impinge upon the sound reflecting surfaces of each passing vehicle and be reflected back toward a receiving transducer. At the same time, the sound pulses are so directed that, in the absence of any vehicle, they impinge instead upon a sound reflecting surface which is more distant than the vehicles to be detected. Such an arrangement is readily provided by positioning both transmitting and receiving transducers over the top of the roadway and directing them downwardly towards its surface. When no vehicle is present, the sound pulses are reflected from the surface of the road, but when a vehicle intercepts the beam the sound pulses are instead reflected from the uppermost surfaces of such vehicle. Time-gating circuits differentiate between the pavement and vehicle reflection pulses since the latter will tend to have an appreciably shorter propagation time than the former. In this prior system, in order for a vehicle to be registered, it is required that vehicle reflection pulses be received and concurrently that the normally received pavement pulses be terminated and this must be followed by a restoration to the normal condition wherein only the pavement reflection pulses are received but not the vehicle reflection pulses. It is only when this particular sequence of events occurs that a vehicle is registered. As is described above in detail in our above patent, these requirements ensure an extremely high degree of accuracy in vehicle counting.

The above description relating to the invention which is disclosed in our above patent has been particularly given to emphasize the distinctions which are present in the present invention. In this invention, high accuracy in the number of vehicles registered is not of paramount importance. It is, for example not highly significant that a single vehicle be registered more than once. Instead, it is important to provide a system which will monitor a given detection zone in such a way that the passage of any one or more vehicles through the zone will be properly registered. In other words, it is desired that any flow of traffic through the detection zone cause the detection equipment to be distinctively operated to provide an indication thereof. It is also required that the apparatus for accomplishing this not be unduly complex nor expensive. Furthermore, it is desirable that the system provide for considerable flexibility so that, wherever possible, the same equipment may be used in common for a plurality of different detection zones.

These objectives are met in the system of the present invention by directing a beam of repetitive sound pulses, which are individually of relatively high power, across the path of the vehicles and receiving the reflections which are obtained from passing traffic by receiving means which includes a receiving transducer. In the absence of any vehicle, the sound pulses may impinge upon a sound reflecting surface, and this will surely be the case where the beam is directed downwardly toward the surface of the pavement and the receiving transducer is also positioned overhead so that it can receive the pavement reflection pulses. However, it is a characteristic of this invention that these pavement reflection pulses not be utilized but instead be rejected; the detection of vehicles comes about entirely as a result of the reception of reflection pulses from the vehicles themselves.

In addition, the system is so organized that a number of transmitting transducers may be connected in parallel or in series to a common transmitter and also that a plurality of receiving transducers may be connected in parallel to the input circuit of a single receiver. This ability to use a single receiver for a plurality of different detection zones is in contrast with that of the detection system of the aforesaid Kendall et al. application and comes about principally because no use is here made of the pavement reflection. Thus, it will be apparent from the brief description given above relative to our above patent, that it would be impossible in a vehicle detection system organized in the manner described there to utilize a single receiver for different detection zones. More specifically, the presence of a vehicle in one detection zone would, it is true, provide vehicle reflection pulses to the transducer monitoring such zone, but at the same time pavement reflection pulses would be received by the receiving transducers for one or more of the other zones where no vehicle was present. It would, therefore, not be possible to insist in such a system that there would have to be a simultaneous occurrence of vehicle reflection pulses with a total concurrent absence of pavement reflection pulses.

Described briefly, the present invention contemplates that a sound pulse transmitter will generate repetitive sound pulses of relatively high power which may then be applied to as many different sound transducers as are desired to be connected in parallel at a given installation. As to the different detection zones in which it is desired to determine that there is some flow of traffic but wherein it is not necessary that traffic flow be separately determined, the receiving transducers of such different detection zones can be connected in parallel to a common receiver. This receiver includes a gated amplifier stage which is rendered non-responsive for an interval of controllable duration following the transmission of each sound pulse. At the conclusion of this interval, the gated amplifier becomes responsive for another interval of controllable duration, and this latter interval encompasses the expected time of reception of reflection pulses from vehicles passing in the detection zones being monitored. If any reflection pulse is received during this timed interval, regardless of which receiving transducer receives such reflection pulse, an associated multivibrator is permitted to go into operation. On the next cycle, i.e., after the transmission of the next sound pulse, the multivibrator again can go into operation if a reflection pulse is once more received during the gated interval. After there has been a predetermined number of such successive cycles of operation of this multivibrator, the associated relay is operated to indicate the presence of traffic in one or more of the respective detection zones.

As will subsequently be described in detail, use of the gated multivibrator to control the traffic detection relay also facilitates the paralleling of a number of receiving transducers because it makes it entirely immaterial that more than one vehicle reflection signal may be obtained in response to a single transmitted pulse. In addition, a control circuit is provided for the above-mentioned relay which ensures that there will be no tendency for the relay to flutter between its opposite conditions at the time it is operated from one state to the other.

It is, accordingly, an object of this invention to provide a vehicle detection system for detecting the flow of vehicular traffic in one or more of a plurality of independent detection zones.

It is another object of this invention to provide a vehicle detection system wherein a beam of sound pulses is transmitted across the path of each vehicle and wherein time gating circuitry is employed wihch permits the acceptance of reflection signals only from vehicles in such zone and where such time gating circuitry is or a considerably simplified form permitting a low-cost detection system.

Another object of this invention is to provide a vehicle detection system wherein sound pulses are transmitted simultaneously across the paths of vehicles in different detection zones simultaneously and where registering means for detecting the flow of traffic in any of such zones is operated in the same way irrespective of the number of such zones wherein vehicle traffic is found and thus independent of the number of vehicle reflection pulses which are received in response to each individual transmitted sound pulse.

Another object of this invention is to provide a vehicle detection system wherein a relay is provided which is operated upon the detection of vehicular traffic and wherein a circuit organization provides for the positive, non-fluttering operation of such relay.

Other objects, purposes, and characteristic features of this invention will in part be obvious from the accompanying drawings and will in part be further pointed out as the description of the invention progresses.

In describing the invention in detail, reference will be made to the accompanying drawings wherein:

FIG. 3 is a detailed circuit drawing of the system of this invention;

Figure 1:
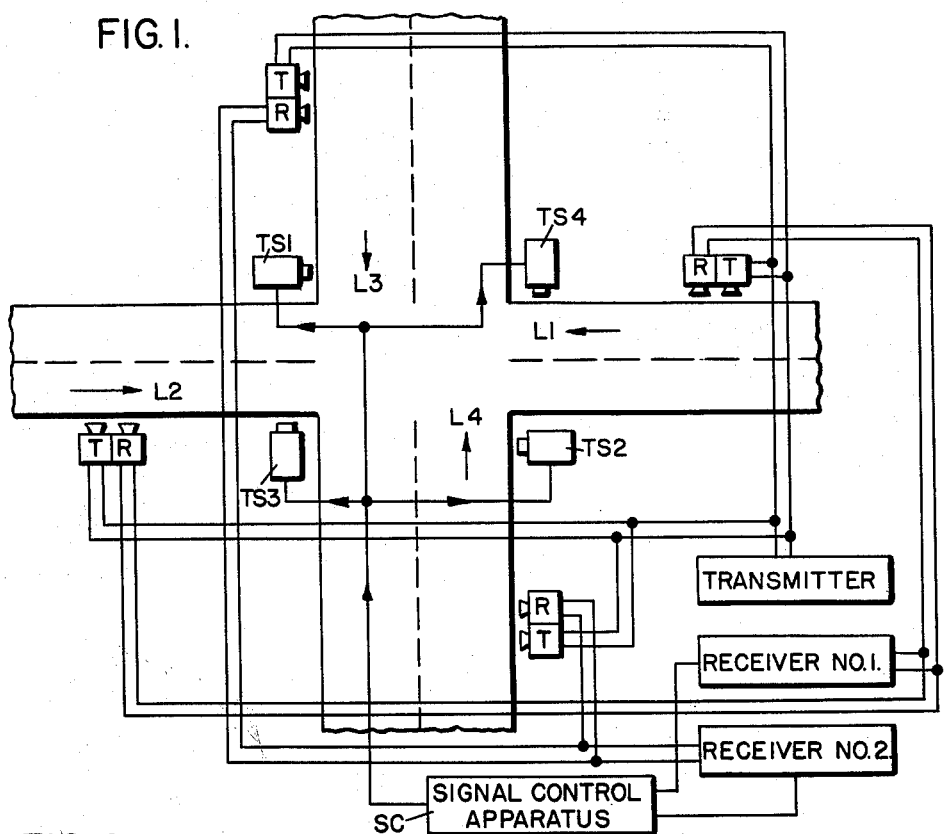
FIG. 1 illustrates diagrammatically one possible field of use of the vehicle detection system of this invention.

To facilitate the description of this invention, the various parts and circuits are shown diagrammatically in the drawings, and certain conventional illustrations have been employed to make it easier to understand the nature of this invention. The various electron tubes employed are of generally conventional type and have independent heaters which are not shown in the drawings. The symbol (B+) and the symbol for a ground connection indicate connections made to the opposite terminals of a source of relatively high voltage suitable for the operation of the various electron tubes.

Referring first to FIG. 1, there is shown here diagrammatically one of the various possible ways in which the vehicle detector system of the present invention may be employed. A typical fourway intersection is shown with lanes L3 and L4 being allocated for traffic approaching the intersection and travelling on the main artery and with this traffic being controlled by traffic signals TS3 and TS4, respectively. Lanes L1 and L2 are similarly provided for traffic approaching the intersection along the side street; the traffic signals TS1 and TS2 similarly control traffic moving in these two lanes.

At a suitable distance in advance of the intersection on each of the designated lanes there is located a transducer unit comprising a transmitting transducer T and an associated receiving transducer R. Each unit may be located in the order of 100 feet or so in advance of the intersection so that traffic approaching the intersection will be properly detected and this detection made known to signal control apparatus SC which then controls the various traffic signals TS1 through TS4. In this FIG. 1, the various transducer units are shown as being of the so-called "side-fire" type wherein the sound beam is directed in a substantially horizontal direction across the highway so that vehicles passing through the near lane and approaching the intersection must interrupt this sound beam and cause a reflection of the beam to be returned to the associated receiving transducer. This positioning of the transducers permits the sound beam to be reflected as well from vehicles travelling away from the intersection in the other lane, but means are provided for permitting such effects to be totally ignored by the vehicle detection system. If desired, the transducer units may be mounted overhead and directed downwardly towards the tops of passing vehicles. Such an arrangement of the transducers is shown, for example, in the abovementioned patent. When this is done, the sound beam normally impinges upon the pavement but the pavement reflections are also readily distinguished from the reflections obtained from the vehicles desired to be detected and are also totally ignored.

The detailed manner in which the vehicular traffic detection apparatus of this invention may actually be employed to control the various traffic signals is not a part of this invention and thus will not be described in detail here. It will, of course, be evident that there may be numerous circumstances where it is not necessary to provide for detection of traffic on all of the four approaches to an intersection as was shown in FIG. 1. For example, it is frequently provided that the traffic signals TS3 and TS4 will ordinarily display a proceed indication for traffic moving along the main artery and with the signals TS1 and TS2 displaying a restrictive indication. It is then only necessary that traffic on either of lanes L1 or L2 be detected for, when this occurs, the signals TS1 and TS2 are controlled to give a proceed indication for a limited time interval during which traffic flow on the main artery and through the intersection is prohibited by the restrictive indication concurrently presented by the signals TS3 and TS4.

Figure 2:
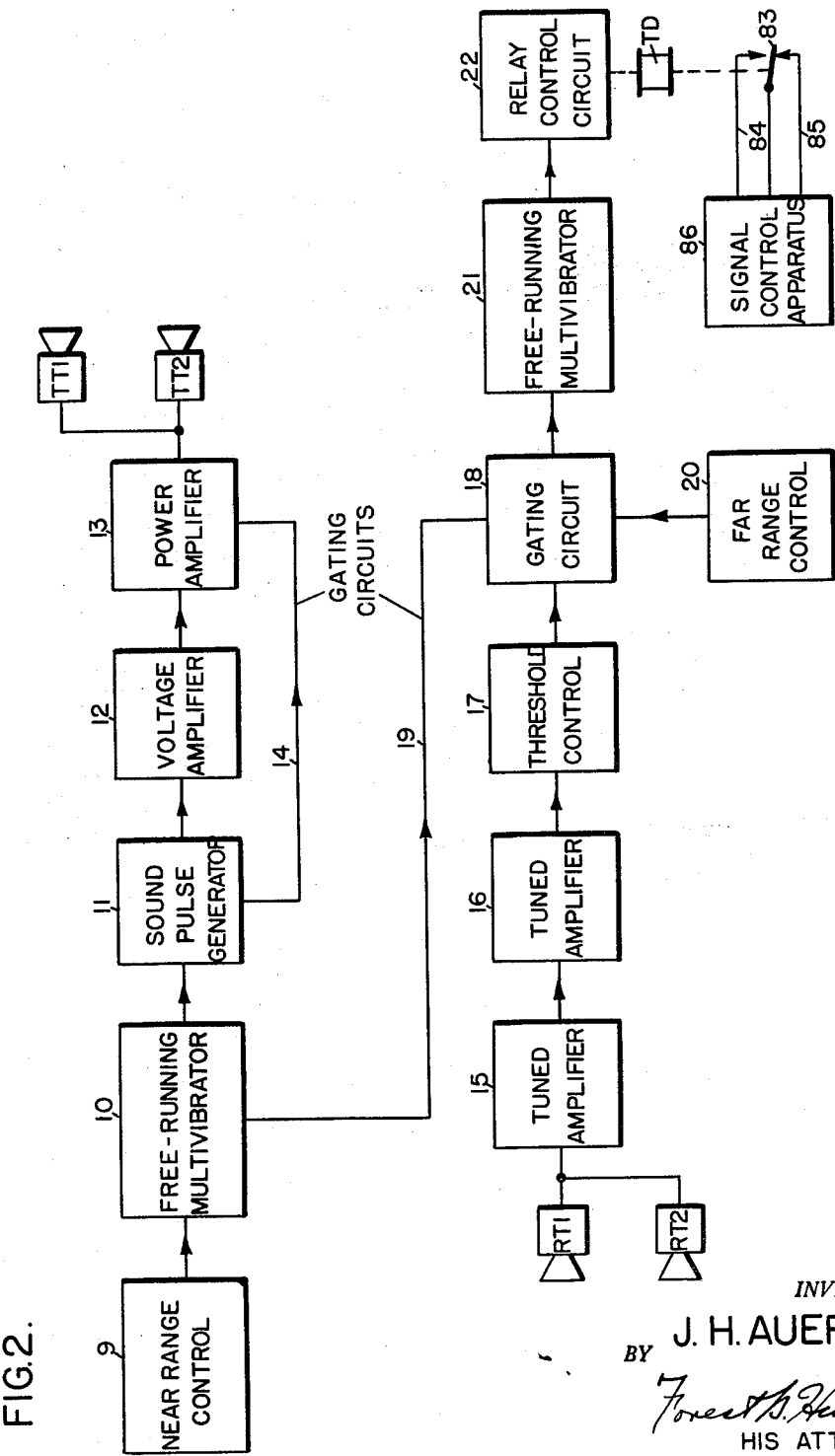
FIG. 2 is a block diagram of the vehicle detection system of this invention.

FIG. 2 illustrates in block diagram form the preferred embodiment of the transmitting and receiving organization of this invention. The repetition rate of the sound pulses which are transmitted regularly is determined by the free-running multivibrators 10. On each cycle of its operation, it produces an output pulse which triggers the associated sound pulse generator 11 into operation so that an electrical signal of an ultrasonic frequency and of fixed, short duration is generated and applied to the voltage amplifier 12. The multivibrator 10 has associated therewith a circuit designated as a near range control 9. The effect of this latter circuit is to demarcate a relatively short interval beginning with the transmission of each sound pulse during which the receiver will be nonresponsive to any received signal picked up by a receiving transducer RT1 or RT2 as will later be more fully described.

Each sound pulse provided by the sound pulse generator 11 is amplified by the voltage amplifier 12 whose output is then applied to the power amplifier 13. Each output pulse of this latter amplifier is of rather substantial power and is applied to the various parallel-connected transmitting transducers such as TT1 and TT2. Since the power amplifier 13 is organized to provide sound frequency pulses of high energy content it would ordinarily be expected that the various tubes of such amplifier and other circuit components as well would be required to be of heavy duty type. This has been avoided in the present invention by providing a novel gating circuit for the power amplifier. The gating circuit utilizes the fact that the sound frequency pulses, although individually of high power, nevertheless have a rather low duty cycle since each sound pulse is of quite short duration, in the order of one millisecond in length, whereas the interval between successive pulses may approximate 40 milliseconds. The circuit which is provided stores energy for each pulse in the relatively long interval between successive pulses and throughout this time the power amplifier is fully cut off by the gating circuit represented by the connection 14 between sound pulse generator 11 and power amplifier 13. However, at the time of each sound pulse, the power amplifier 13 is turned on, and the stored energy becomes instantly available to amplify and provide a sound pulse of substantial magnitude. In addition, this reduces total input power.

With respect to the receiver circuit, the various receiving transducers represented by the transducers RT1 and RT2 in FIG. 2, are all connected in parellel and supply their electrical output signal corresponding to the received sound energy to a tuned amplifier 15. This amplifier not only amplifies the signal but strongly discriminates against extraneous signals having frequencies other than that of the transmitted sound pulse. The output of amplifier 15 is applied to another similar tuned amplifier 16 whose output, in turn, is applied to the threshold control 17. The function of this threshold control 17 is to discriminate against low level interference, either electrical or sonic.

The output of the threshold control 17 is applied to a gating circuit which also receives an input over wire 19 from the free-running multivibrator 10. This gating circuit demarcates an interval during which bona fide reflection signals from vehicles can be expected. Its beginning is established by a gating voltage appearing on wire 19 and obtained from multivibrator 10 and appearing a predetermined time after the transmission of each sound pulse as determined by the setting of the near range control 13. The duration of the gating voltage is established by the far range control 20. The effect of this gating circuit 18 is to permit the free-running multivibrator 21 to go into operation for any output of the threshold control 17 provided that it occurs within the limits of this gating voltage demarcated by the gating circuit 18. The free-running multivibrator 21 will restore itself to its original condition prior to the reception of reflections of the next transmitted sound pulse. As a result, the presence of traffic which causes any of the paralleled receiving transducers to receive reflection pulses will on each successive cylce permit another cycle of operation of the multivibrator 21 to occur.

The relay control circuit 22 which controls the operation of the traffic detector relay TD, is operated in accordance with the average value of an output signal obtained from the multivibrator 21. This output signal is of a steady value as long as the multivibrator is restrained from operating by the gating circuit but varies between two different levels as the multivibrator operates between its two opposite conditions and thus assumes a distinctly different average value. It is desired that the relay TD be actuated after reflection signals have been obtained in response to a predetermined number of successively transmitted pulses each of which has caused the multivibrator 21 to operate through one cycle of operation. Because of this, it is necessary for the multivibrator 21 to operate uniformly on successive cycles so that the charge on an associated capacitor will be determined only by the number of times that the multivibrator has operated. As will be shown, the charge of this capacitor controls the operation of the traffic detector relay TD. Otherwise, if the average value were to vary from one cycle to the other, the actuation of relay TD would not be affected only in accordance with the number of cycles of operation of the multivabrator but also by the average values of the voltage on each of the individual cycles of operation. For this reason, various expedients are employed to ensure that the multivibrator operation will be uniform so as to provide a known average value of its output whenever it operates.

Referring now to FIG. 3, the free-running multivibrator 10 is shown as including the two tubes 25 and 26 whose respective plate and grid circuits are interconnected by the coupling capacitors 27 and 28. Free-running multivibrators of this type are well-known in the art so that it is deemed unnecessary to describe its operation in detail here. It will suffice to say that one of the two tubes is always fully conductive and the other fully cut off and that these conditions alternate between the two tubes almost instantaneously at a rate which is determined in accordance with the time constants for the discharge of the respective coupling capacitors 27 and 28.

Figure 4:
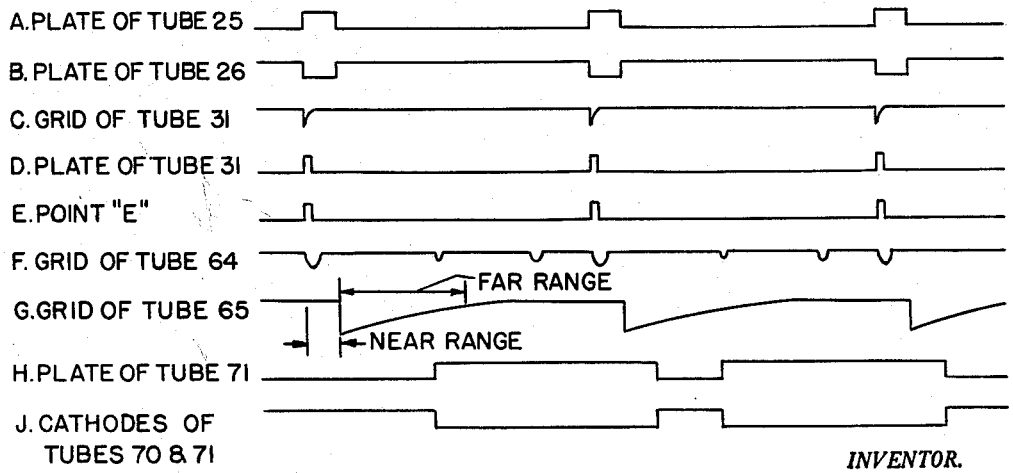
FIG. 4 is a wave form diagram illustrating various voltage wave forms which appear in the detailed circuit of FIG. 3.

An output of this multivibrator is obtained from the plate of tube 26. Whenever tube 26 is conductive, this voltage is at a relatively low level, but it rises to substantially the level of the (B+) source whenever tube 26 becomes cut off. As the multivibrator switches back and forth between its two opposite conditions, the voltage that then appears at the plate of tube 26 is as shown at line B of FIG. 4 whereas the voltage at the plate of the other tube 25 has the wave-form shown at line A of FIG. 4.

The period of time throughout which tube 25 remains nonconductive so that its plate voltage is at a high level is determined primarily by the time constant for the discharging of capacitor 27. More specifically, when the tube 26 becomes conductive so that its plate voltage is abruptly decreased in amplitude, a corresponding negative-going voltage variation appears at the grid of tube 25, driving this tube immediately to cut off; thereafter the length of time that tube 25 remains cut off is dependent upon how long it takes for the capacitor 27 to discharge since, as this capacitor 27 discharges, it permits the grid voltage of the tube 25 to rise until finally the cut-off potential of the tube is reached at which time it is switched to its fully conductive condition, at the same time cutting off tube 26. This time constant for the discharge of capacitor 27 is determined in part by the resistance of variable resistor 29. By increasing the size of this resistance, a longer time must elapse before the grid voltage of tube 25 will rise to the cut-off level, and thus this resistor 29 provides a measure of control over the time that the voltage at the plate of tube 25 and appearing on wire 30 is at a high level. As will subsequently be shown, signals received by the transducers and applied to the receiver during the interval that this high voltage appears on wire 30 are rejected and thus the variation of resistance provided by resistor 29 establishes what has been designated the near range control because it in effect defines the beginning of the gating interval wherein received sound energy will be admitted. Any sound energy impinging on the receiving transducer in the interval following the transmission of the sound pulse and prior to the beginning of this gating interval can safely be excluded since no bona fide reflection pulse from a vehicle can have so short a propagation time.

The sound pulse generator 11 includes a triode tube 31 whose grid is connected to (B+) through resistor 32 so that this tube is ordinarily in a full conductive condition. The cathode circuit of this tube includes a parallel resonant circuit comprising capacitor 34 and inductor 33 whose values are so selected that this cathode circuit exhibits parallel resonance at the desired frequency of the sound pulses to be transmitted. The plate circuit includes a resistor 35, and the grid of this tube is capacitively coupled to the plate of tube 26 through capacitor 36.

Upon the occurrence of a positive-going voltage variation at the plate of tube 26, there is a tendency to drive the grid of tube 31 more positive, but this has substantially no effect because this tube is already in a fully conductive state. However, upon the occurrence of a negative going voltage variation at the plate of tube 26, a corresponding voltage decrease appears at the grid of tube 31 (FIG. 4, line C) thereby driving this tube to the cut-off state. When this happens, there is a shock excitation of the tuned cathode circuit so that oscillations at the desired ultrasonic frequency appear at the cathode of tube 31 which are then coupled through coupling capacitor 37 to the control grid of tube 38.

Tube 38 is a conventional voltage amplifier stage provided with cathode bias as a result of its cathode resistor 39 which is bypassed by capacitor 40. The output voltage appears across the plate load resistor 41 and is coupled through capacitor 42 to the control grid of the pentode power amplifier tube 43. This latter tube is also provided with cathode bias, and its suppressor grid is connected directly to the cathode. The screen grid is provided with the required positive bias voltage by being connected through resistor 44 and resistor 45 to the (B+) voltage source. The plate circuit of the tube includes the primary winding of a transformer T1 whose secondary winding is connected to the input terminals of a filter 46. This filter is tuned to pass readily the frequency of oscillation generated in the cathode circuit of tube 31 but tends to discriminate against other frequencies. The output of the filter 46 is applied to the various transmitting transducers TT1 and TT2 which are parallel-connected to the filter output terminals.

At the instant that tube 31 is cut off to permit the ultrasonic frequency to be generated in its cathode circuit, there is at the same instant a resulting abrupt increase of voltage at the plate of this tube (FIG. 4, line D) since there is then no longer any voltage drop across the plate load resistor 35. This rise in plate potential produces a very quick charging of capacitor 47 since the charging current encounters only the low forward resistance of rectifier 48 and resistor 35. It is thereby ensured that, at the very instant of the initiation of the pulse of ultrasonic frequency, the voltage at the upper terminal of rectifier 48 (point E) will be substantially at ground potential; it is, of course, prevented from rising any appreciable amount above ground level because of the very low forward resistance of the rectifier 48 whose lower terminal is grounded. Because of the existence of this ground potential at point E at this time, substantially the only bias voltage applied to tube 43 is that resulting from its cathode bias resistor 49, and this is, of course, not adequate to hold the tube cut off so that tube 43 will conduct in response to the ultrasonic frequency pulse applied to its grid from the plate of tube 38.

Tube 31 remains non-conductive in response to the negative going voltage variation obtained from tube 26 for only a very brief interval, in the order of one millisecond. At the end of this time, tube 31 again becomes conductive, thereby interrupting the oscillations in its cathode circuit and at the same time producing an abrupt decrease in its plate potential. Capacitor 47 can now discharge only relatively slowly since it encounters now the high back resistance of diode 48 which is paralleled by the relatively high resistance of resistor 50. Because of this, there is an abrupt decrease of voltage at point E which persists for some time, thereby maintaining the grid bias voltage of tube 43 so reduced in value that this tube can no longer conduct any plate current at all. The time constant for the discharging of capacitor 47 is selected to be sufficiently long to maintain tube 43 cut off throughout the interval between successive pulses. It is only when tube 31 is again rendered non-conductive so that its plate voltage is appreciably increased that the cut-off bias on tube 43 is removed. As a result, tube 43 is always cut off except for that brief interval of time each cycle during which tube 31 is cut off and the ultrasonic frequency pulse generated in its cathode circuit.

The various circuit components associated with tube 43 are so selected that when this tube is permitted to conduct in response to the ultrasonic frequency pulse, a substantial current will flow in the plate circuit, thereby permitting a pulse of relatively high power to be developed across the secondary winding of transformer T1. It is desired, however, that the energy for this pulse not all be drawn from the power supply at the instant of its generation but rather that energy be stored at a relatively slow rate during the relatively long interval between successive pulses and then be made available at the short instant of pulse amplification. This storage of energy is accomplished by capacitor 51 connected between the lower terminal of resistor 45 and ground. Throughout the time that tube 43 is non-conductive, capacitor 51 charges through resistor 45 to substantially the value of the (B+) voltage. Capacitor 51 preferably has a relatively high value of capacitance so that a substantial amount of electrical energy can be stored therein. At the instant that tube 43 is rendered conductive, only a relatively small amount of its plate current is drawn through the rather high resistance of resistor 45 and thus from the (B+) source; by contrast, most of the required current is drawn from the now charged capacitor 51. In this way, a very high value of plate current may be drawn for a very brief interval through the plate-cathode circuit of tube 43 without imposing any high instantaneous load upon the power supply.

At the instant that tube 43 is restored to its normal non-conductive state, there is an abrupt cessation of current in the primary winding of step down transformer T1, and the rapid rate of change of current which this produces tends to generate a voltage pulse of high amplitude across the primary winding of this transformer. To minimize any undesired effects from this, a double Zener diode 52 is connected across the secondary winding. For ordinary values of voltage across the secondary winding, the double Zener diode 52 remains wholly non-conductive, but the higher voltage appearing upon the collapse of the magnetic field in the secondary results in a discharge through this diode 52 so that no unduly high voltage will be generated in the primary winding.

Considering now the receiver circuit, the several receiving transducers represented by RT1 and RT2 are connected in parallel across the primary winding of input transformer T2. The secondary winding of this transformer is connected in the grid circuit of a tuned pentode amplifier stage including tube 56. The construction of this amplifier stage is conventional and no detailed description thereof need be given. The plate circuit includes a parallel tuned circuit which is tuned to the frequency of the ultrasonic frequency pulses generated by the transmitter. As a result, received sound energy at this frequency tends to produce a relatively high voltage across the tuned plate circuit as opposed to energy at other frequencies. The output signal obtained at the plate of tube 56 is coupled to the control grid of a similar tube 57 through capacitor 58. This tuned amplifier stage including tube 57 is substantially identical to the amplifier stage including tube 56.

The amplified signal obtained at the plate of tube 57 is applied to the threshold control circuit which comprises diodes 59 and 60, potentiometer 61, resistor 162, capacitor 63 and resistor 163. The tap on potentiometer 61 is set to provide a direct-current voltage at the tap whose amplitude is such as to prevent the passing of low level noise but will allow most bone fide reflection signals appearing at the right-hand terminal of capacitor 62 to pass. In other words, for any received sound signal producing an alternating voltage at the right-hand terminal of capacitor 62 with a peak-to-peak amplitude less than the direct-current voltage at the tap of potentiometer 61, there will be no input signal to the control grid of triode tube 64.

The operation of this threshold control circuit is as follows: Diode 60 acts as a clamper and ensures that the voltage at its upper terminal cannot go appreciably above the level of voltage at the tap of potentiometer 61 even for the positive peaks of the signal. Thus, the alternating signal at this point can only vary negatively from this positive clamping voltage. As long as the peak-to-peak amplitude of the signal does not exceed the clamping voltage, the voltage at the upper terminal of diode 60 will at all times remain above ground so that there can be no charging of capacitor 63 through the high back resistance of diode 59. On the other hand, any alternating signal at the upper terminal of diode 60 having a peak-to-peak amplitude greater than the threshold voltage, requires that the voltage at this point go negative for at least a portion of each negative half-cycle. On each cycle of the reflection signal causing the voltage at this point to go below ground, there results a negative charging of capacitor 63 through diode 59. Between successive cycles, capacitor 63 can only discharge through the relatively high resistance provided by resistor 162. The result is that a negative voltage soon builds up on capacitor 63 which is maintained for as long as the alternating signal maintains its peak-to-peak amplitude greater than the threshold voltage. Of course, when this condition no longer obtains, capacitor 63 steadily discharges. The circuit is organized so that the negative capacitor voltage is sufficient to permit triode 64 to become cut-off after there have been several successive cycles of the received sound pulse, each of sufficient amplitude to charge capacitor 63 negatively. In this way, each bona fide reflection pulse is permitted to drive tube 64 to cut-off for a limited time. Upon the expiration of the sound pulse, tube 64 remains conductive for a time as capacitor 63 slowly discharges. Thus, each reflected sound pulse, although perhaps of only one millisecond duration, is able to hold tube 64 cut off for a longer interval as required.

The plate of triode 64 is connected to the plate of a similar triode 65. The control grid of this latter tube is connected through capacitor 66 to wire 30 which, as already described, is connected to the plate of tube 25 included in the free-running multivibrator 10. As previously mentioned, at the time the ultrasonic frequency pulse is generated, the plate voltage of tube 25 goes abruptly positive and remains there throughout a variable time dependent upon the setting of the variable resistor 29. Throughout this time, this positive voltage drives the control grid of tube 65 positive and maintains it there because of the relatively slow charging time constant of capacitor 66. However, when the free-running multivibrator 10 switches back to its opposite state wherein tube 25 is conductive, then the abrupt decrease in its plate voltage produces a cut-off grid voltage for tube 65. The length of time throughout which tube 65 can remain cut off in response to this negative-going voltage variation is dependent upon the setting of the tap on potentiometer 67. When this tap is towards its uppermost position, capacitor 66 discharges more quickly with the result that tube 65 is then in a cut-off condition for only a relatively short length of time. If, on the other hand, the tap is moved toward the bottom position, then capacitor 66 can discharge more slowly with the result tube 65 will then remain non-conductive for a longer time interval. This provides a means for establishing the length of the gate during which reflection signals will be permitted to be effective (FIG. 4, line G) and this control corresponds to the so-called far range control indicated diagrammatically by the block 20 in FIG. 2.

The triode tubes 64 and 65 together comprise a coincidence circuit in the sense that their common plate connection can rise to a relatively high level of voltage only when both tubes are concurrently driven to cut-off. When either or both of these tubes is not driven to cut-off, there is then a flow of plate current of the conducting tube or tubes through resistors 75, 76, and 77, thereby holding the plates at a relatively low voltage. However, whenever there are reflection pulses received which are effective to charge capacitor 63 in the grid circuit of tube 64 negatively so as to cut this tube off, and provided that this occurs at a time when tube 65 is also cut off by reason of the negative voltage variation obtained from the plate of tube 25, there is then no flow of current through the above-mentioned plate resistors for tubes 64 and 65 so that this voltage can then rise appreciably above its normal relatively low value.

Triode tubes 70 and 71 are interconnected to form a free-running multivibrator. In normal operation, such a multivibrator repetitively operates between two alternative opposite states wherein one tube is fully conductive and the other tube fully cut off. The operation of this multivibrator need not be described in detail because its general mode of operation is well-known; however, several distinctive features will be described. One of these features resides in the use of a substantially lower resistor 74 in the plate circuit of tube 71 than is used for the corresponding plate resistor 78 included in the plate circuit of tube 70. This feature and others will be described in more detatil subsequently.

For reasons which will soon become apparent, this multivibrator normally is in the condition in which tube 70 is cut off and tube 71 is conductive. Because of the relatively low value of plate resistor 74, this means that there is a substantial voltage developed across cathode resistor 72. Although the tendency of the multivibrator is to operate itself to the opposite statew here tube 70 is made conductive, this is prevented normally by reason of the relatively low plate voltage for the common plates of tubes 64 and 65. Although this common plate voltage is somewhat above ground, and resistor 75 causes grid of tube 70 to be still further above ground, the grid is still below the cathode voltage of tubes 70 and 71 which is now substantially above ground, thereby preventing tube 70 from becoming conductive even though capacitor 79 may have become fully discharged in the interval which stated when tube 71 became conductive.

However, when a bona fide reflection pulse is received from a vehicle within the expected time, both tubes 64 and 65 will simultaneously be driven to cut off so that the voltage at their common plates will be substantially positive, thereby permitting the grid-cathode voltage of tube 70 to go above cut-off so that it becomes conductive. At the very same instant, tube 71 will become non-conductive because its grid will be driven below cut-off by reason of the sudden drop in voltage at the plate of tube 70. However, this condition will persist only for a length of time dependent upon the time constant for the discharging of capacitor 80. As this capacitor discharges, the grid of tube 71 rises in voltage until finally tube 71 again becomes conductive, at which time there is a sudden drop in plate potential of the tube, and this is coupled through capacitor 79 to the grid of tube 70, thereby restoring the multivibrator again to its original condition. Capacitor 79 thus starts to discharge, allowing the grid voltage of tube 70 to rise so that there is a tendency toward another switching action of the multivibrator. This, however, is dependent upon the condition of tubes 64 and 65 and cannot occur if either is at that time conductive. However, if at the time of the next cycle, tubes 64 and 65 are again concurrently non-conductive, then the multivibrator, comprising tubes 70 and 71, will be permitted to go through another cycle of operation. In other words, the multivibrator, although of the free-running type, is held in the condition wherein tube 70 is non-conductive as long as either or both tubes 64 and 65 are conductive. However, there is no similar restriction on the operation of the multivibrator when in its opposite state, so that when released it will never stay in the condition wherein tube 70 is conductive, but will always restore itself to the condition wherein tube 70 is non-conductive.

With this understanding of the mode of operation of the multivibrator, it will now be readily understood why it is advantageous to have resistor 74 of substantially lower resistance value than resistor 78. Thus, when the multivibrator has been permitted to operate to the condition wherein tube 70 is conductive but tube 71 is cut off, the higher resistance of resistor 78 as opposed to resistor 74 substantially decreases the voltage drop across cathode resistor 72. Because of this, the drop in grid voltage of tube 70 that results when either or both of tubes 64 or 65 becomes conductive cannot prematurely restore the multivibrator to its original state wherein tube 70 is cut off. Instead, the multivibrator will restore itself only after a predetermined interval when the grid of tube 71 has risen sufficiently in potential by reason of the discharge of capacitor 80 to permit tube 71 to conduct again and thereby restore tube 70 to the non-conductive condition. In this way, the multivibrator is made immune from changes of voltage occurring at the grid of tube 70 once the multivibrator has been allowed to go into a cycle of operation in that its cycle time becomes independent of the gating input obtained from triodes 64 and 65.

The advantage in having the multivibrator constructed to operate as a free-running multivibrator rather than a one-shot multivibrator is that it will then go into operation without requiring that a trigger pulse be applied to it. This is important because, when successive reflection pulses are received so that the multivibrator is repeatedly operated, it may very well occur that the condition of having both tubes 64 and 65 simultaneously non-conductive will have been reached just prior to the time that capacitor 79 has become discharged, in which event, the previously occurring voltage drop at the plate of tube 71 will still be holding the grid voltage of tube 70 at a depressed level. If the multivibrator were a one-shot multivibrator, there would then not be the required triggering input available to set it into operation. However, by having the multivibrator operate as a free-running multivibrator, it will immediately go into another cycle of operation as soon as the required conditions are met which permit a rise in the grid potential of tube 70 to above cutoff.

It is of some importance that tube 70 remain non-conductive for some predetermined minimum interval each time it is restored to this condition. This ensures that capacitor 80 will have the opportunity to become fully charged. If this is not done, then tube 71 will not remain non-conductive for a definite interval, but instead this interval would be variable and would depend upon the amount of charge that capacitor 80 had acquired and this, in turn, would depend upon the length of time that tube 70 had been non-conductive on the immediately preceding cycle. As will subsequently be apparent, it is important to the operation of the relay control circuit that the time during which tube 71 be non-conductive on each cycle be substantially fixed. Any difficulties along this line are eliminated by selecting the values of capacitor 79 and resistor 77 to provide a sufficiently long time constant for capacitor 79 that tube 70 will remain non-conductive for at least the minimum time.

Control of the traffic detector relay TD is effected by the two triode tubes 81 and 82. The winding of relay TD is included in series in the plate circuit of tube 81 and since this tube is normally conductive, as will presently be shown, relay TD is normally picked up. The presence of traffic causes the multivibrator comprising tubes 70 and 71 to operate repetitively and this so reduces the plate current of tube 81 that relay TD drops away, thereby opening its front contact 83 and closing its back contact 83 to thereby provide a shunt between wires 84 and 85 and also providing an indication of traffic to the signal apparatus 86.

In the absence of any traffic, the multivibrator is inoperative with tube 71 conductive as already described. Because of the lower value of resistance of resistor 74 as compared to that of resistor 78, this means that the cathode voltage across resistor 72 is at a relatively high value. This ensures that there is a correspondingly high positive charge across capacitor 87 and that the voltage at the grid of tube 81 is sufficiently positive with respect to its cathode that the resulting plate current will pick up relay TD.

Cathode bias is provided for tube 81 in part by the flow of plate current of tube 81 through cathode resistor 88, and in part also by the flow of the plate-cathode current of tube 82 through this same cathode resistor 88. (Under quiescent conditions, i.e., with capacitor 89 neither charging nor discharging, there is some flow of current through the plate-cathode circuit of tube 82.) Nevertheless, despite this cathode bias, tube 81 will normally conduct sufficiently to maintain relay TD picked up.

As described previously, when there is traffic present, the multivibrator comprising tubes 70 and 71 operates repeatedly, going through a complete cycle of operation for each transmitted sound pulse reflected from passing vehicles. Since the voltage appearing across cathode-resistor 72 is appreciably lower when tube 70 is conductive as opposed to tube 71, this means that this cathode voltage will alternately vary between its normal value and some lower value. Since the length of time that tube 71 is non-conductive is fixed between successive cycles of operation of this multivibrator, there is a predetermined amount of discharging of capacitor 87 which occurs for each cycle of operation of the multivibrator. Since the time constant for the charging and discharging of this capacitor 87 is relatively long as compared to the duration of the cycle of the multivibrator, capacitor 87 cannot charge back to its original voltage level each time that the voltage across resistor 72 is restored to its normal higher value. Consequently, the repetitive operation of the multivibrator brings about a lower average voltage across capacitor 87. The time constant for the discharge of this capacitor is readily regulated by varying the variable resistor 90, and its value is selected so that a predetermined number of cycles of operation of the multivibrator will bring about sufficient reduction in voltage across capacitor 87 to decrease the plate-cathode current to the drop-away value of relay TD.

The function of the associated triode tube 82 is to prevent fluttering in the operation of relay TD in the brief interval that a change in its state takes place and also maintain the cathode of tube 81 at a positive potential which will allow tube 81 to be cut off when its grid potential is reduced. When relay TD is released in the manner just described, the right-hand terminal of capacitor 89, which is normally connected to ground through front contact 91 of relay TD, is then instead connected through back contact 91 and through resistor 92 to the (B+) voltage. Because of this, capacitor 89 charges, and during this charging operation, whose duration is affected, of course, by the time constant for the charging of capacitor 89, there is increased conduction between plate and cathode of tube 82 so that a higher cathode bias voltage appears across resistor 88. This sudden increase in cathode voltage ensures that tube 81, whose plate-cathode current has just been reduced to the point where relay TD drops away, will now have its plate-cathode current reduced still more, thereby preventing relay TD from picking up momentarily. On the other hand, when there is no further traffic to be detected, the multivibrator stops its repetitive operation and capacitor 87 increases its positive charge to the point where there is sufficient plate current of tube 81 passing through the winding of relay TD to pick it up. It is then also desired that tube 82 become effective to ensure positive operation of the relay so that it will not have an opportunity to drop away momentarily. To accomplish this, the lower terminal of capacitor 89 is disconnected from the (B+) source and is instead connected through front contact 91 to ground. This reduces the voltage at the right-hand terminal substantially and causes capacitor 89 to discharge. During this discharge interval, there is a reduction in voltage across cathode resistor 88 causing the grid-cathode voltage of tube 81 to be substantially increased. This brings about a substantial increase in plate current so that there is no opportunity for relay TD to drop away. The interval of time throughout which this effect occurs is again, of course, determined by the time constant for the discharging of capacitor 91. It will be noted that it is entirely possible to provide for different time constants for the charging and discharging of capacitor 89, so that the effect that it has on ensuring positive operation of the relay may be made variable in time according to whether the relay is being picked up or dropped away.

It is entirely possible that the receiving transducer will receive more than one reflection pulse in response to each transmitted sound pulse, and this is particularly true when several such transducers for respectively different zones are all connected to the input circuit of a single receiver. It is desired that the control of the traffic detector relay TD not be affected by this condition and this, of course, requires that the multivibrator including tubes 70 and 71 similarly be also unaffected. This result is achieved by making the gating circuit ineffective on the multivibrator when the latter has started on a cycle of operation in the manner already described and by also constructing the multivibrator so that its period at least exceeds the interval during which tube 65 is non-conductive on each cycle.

From the above description, it will be apparent that transient electrical disturbances or sonic noise must be above predetermined amplitudes in order to act on the multivibrator 21. But even if the amplitude of a transient is relatively stronger than weak vehicle signals, its action so far as the relay TD control is concerned is no stronger than a normal vehicle response signal. As above explained, the relay control circuits require several vehicle signals in order to cause relay TD to respond, but since a transient rarely occurs repeatedly within the gated times such transients are thus effectively eliminated from acting upon the relay. In other words, weak transients are ruled out, and strong transients can be no more effective than a normal vehicle pulse. And since transients are normally not repetitive in nature they are thus ineffective to cause an erroneous operation of the relay TD.

Although various types and forms of transducers can be employed in connection with the practice of the principles of the present invention, it is desired to be definite in this disclosure by pointing out that one typical form of transducer and receiver is disclosed in the prior application of Bolton et al., Ser. No. 8,314, filed February 12, 1960, now U.S. Patent No. 3,040,544. The structure shown in such prior application is repeated in FIGS. 5 and 6 of this application more particularly for the purpose of showing that the electromagnetic transducer 11 is mounted in a head 14 on suitable resilient supports and comprises a transducer constructed to transmit (or receive) a conical beam of ultrasonic energy which is modified by a wedge 146 to actually produce an ultrasonic beam of enlarged conical shape with elliptical base.

Figure 5:
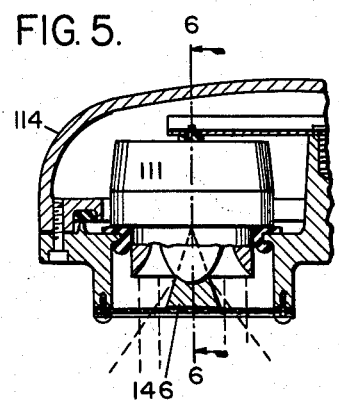
FIGS. 5 and 6 are sectional views showing typical transmitter and receiver structure.
Figure 6:
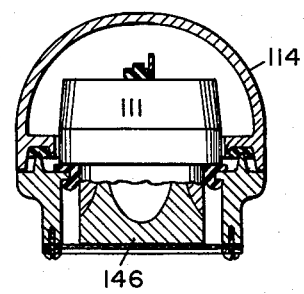

It is to be understood that when a transmitting transducer of the type shown in FIGS. 5 and 6 is employed, the receiving transducer is similarly constructed.

Figure 7:
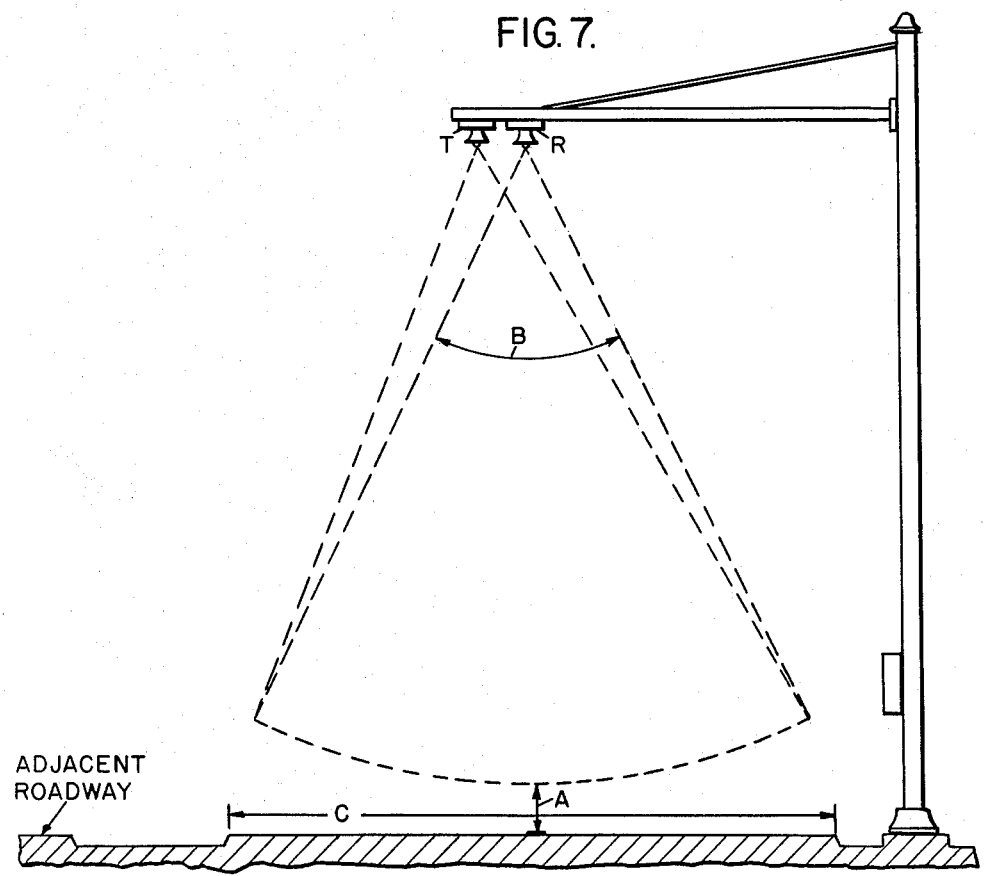
FIG. 7 is a diagrammatic illustration of the effective sonic beam employed in accordance with the principles of the present invention.

Since the receiving transducer provides means of picking up reflected pulses of ultrasonic energy which are received during limited periods of time determined by the gating circuit apparatus, the effective area of the sonic detection over a roadway takes a shape simulating a fan as illustrated in FIG. 7. Since the wedges 146 of the transmitter T and receiver R are aligned longitudinally with regard to the direction of the roadway and effect the spread of the ultrasonic beam in a suitable angle B (see FIG. 7), such as in the order of 45°, and since the gating circuits limit the distance from which reflections can be received to a distance A slightly above the roadway on which vehicles are to be detected, with such distance A being in the order of two feet, it is clear that vehicles on an adjacent roadway will not be detected. The actual width of the roadway with which the detector is associated is represented at C, but it is to be understood that this may vary in dependence upon the height at which the transmitter T and receiver R is located above the roadway, but it is to be understood that such relative dimensions are useful in practical circumstances involving a roadway such as one having two lanes of thirteen feet each.

Obviously, the detecting fan shaped area of FIG. 7 has suitable thickness, so to speak, due to the fact that the deflecting wedges 146 allow some spread longitudinally with regard to the roadway over which vehicles are to be detected.

Although this specific structure and arrangement is illustrated as one possible application of the present invention to practice, it is to be understood that it is only given as one typical illustration.

Having described an improved ultrasonic flow detector system for vehicles as a specific embodiment of this invention, I desire it to be understood that various modifications, adaptations, and alterations may be made to the specific form shown without in any manner departing from the spirit or scope of this invention.

What I claim is:

1. In a system for detecting the presence of vehicular traffic in at least one detection zone defined by a beam of repetitive energy pulses directed across the path of said vehicles comprising in combination, transmitting means including at least one transducer positioned and directed to transmit said pulses across said path and including means for intermittently energizing said transducer at a predetermined repetition rate, receiving means for each said detection zone including a receiving transducer for receiving reflections of said pulses from the reflective surfaces of said vehicles to be detected, output means, gating means coupled between said receiving means and said output means and supplying signals to said output means only in response to reflection pulses received within a predetermined time interval occurring between successive of said transmitted pulses and encompassing the expected reception time by said receiving transducer of reflection pulses from said vehicles in response to the last-transmitted pulse, said output means including means normally in an inactive condition and also including means for operating said normally inactive means from its normal condition only once throughout any said predetermined time interval and only in response to said signal provided by said gating means, said output means including further means responsive to said normally inactive means for indicating the presence of vehicular traffic when said normally inactive means has been operated successively at least a predetermined number of times at a rate approximating said predetermined repetition rate of said transmitting means.

2. The system of claim 1 wherein there are a plurality of detection zones and a receiving and a transmitting transducer for each zone, said transmitting transducers being connected in parallel to the output of said transmitting means and said receiving transducers being connected in parallel to the input of said receiving means, whereby the presence of vehicular traffic in any of said zones causes said output means to be distinctively operated.

3. The system as defined in claim 1 wherein said normally inactive means has an output terminal whose voltage is of a substantially unvarying first value whenever no reflection pulses are being received so that said normally inactive means is not being operated from its normal condition but varies between substantially different levels when said normally inactive means is repeatedly operated from its normal condition, whereby the average value of the voltage at said terminal assumes a substantially different average value when each of at least a predetermined minimum number of successive transmitted pulses produce a reflection pulse that repeatedly operates said normally inactive means from its normal condition, said output means being distinctively operated by said change in voltage at said terminal to said substantially different average value.

4. The system as set forth in claim 3 wherein said output means includes an electron discharge device having a control element for varying its load current in accordance with the voltage applied to said control element, said control element having a voltage applied thereto dependent upon the voltage at said terminal of said binary device, and an electromagnetic relay actuated according to the amplitude of said load current.

5. The invention as defined in claim 1 wherein said normally inactive means comprises a multivibrator normally maintained in an inactive first condition by said gating means but operated from said normal condition only when said gating means supplies a signal thereto.

6. The invention as defined in claim 5 wherein said multivibrator has a period exceeding said predetermined time interval but less than the period of said transmitted energy pulses, said multivibrator when once operated from its said normal condition being non-responsive to further signals provided by said gating means until said multivibrator is restored to its normal condition.

7. In a system for detecting the presence of vehicular traffic moving through a detection zone defined by at least one beam of repetitive sound pulses impinging upon said vehicles the combination comprising, transmitting means including circuit means being free-running between respective opposite first and second conditions, sound pulse generating means being controlled by each operation of said circuit means to its second condition to produce a short pulse of ultrasonic frequency energy, a transmitting transducer energized by each said pulse of energy and positioned and directed to transmit the resulting sound energy pulses toward said vehicles comprising said traffic, receiving means including a receiving transducer positioned and directed to receive reflections of said transmitted sound pulses from the sound reflecting surfaces of said vehicles, cyclically operating means, gating means for normally holding said cyclically operating means in a non-operating normal condition and being controlled by said circuit means on each cycle of its operation to demarcate a time interval encompassing the expected reception time of reflection pulses from said vehicular traffic, said gating means also receiving an input signal from said receiving means for each reflection sound pulse received by said receiving transducer, said gating means being distinctively controlled by the occurrence of said input signal from said receiving means during the occurrence of said demarcated time interval and controlling said cyclically operating means only when so controlled to its distinctive condition to go into its cyclical operation, and output means being distinctively controlled by said operation of said cyclically operating means for providing a distinctive indication of vehicle presence.

8. The system according to claim 6 wherein said gating means is controlled to initiate the demarcation of said time interval when said circuit means restores itself from its second condition back to its first condition, and control means for said circuit means for varying the length of time throughout which said circuit means remains in its said second condition to thereby vary the delay time between the transmission of each sound pulse from said transmitting transducer and the initiation of said time interval demarcated by said gating means.

9. The system according to claim 8 wherein said circuit means is a free-running multivibrator having an output terminal whose voltage varies between different first and second levels as said circuit means operates between its respective first and second conditions, said gating means being controlled by the change in voltage from said second level to said first level to initiate the demarcation of said interval by said gating means.

10. The system according to claim 7 wherein said cyclically operating means is a multivibrator normally held by said gating means in a first of its two respectively opposite conditions but being controlled to a free-running condition when said gating means is in its said distinctive condition.

11. The vehicle traffic detection system of claim 10 wherein the period of said free-running multivibrator of said cyclically operating means is longer than the interval demarcated by said gating means but is less than the period of said circuit means, whereby said free-running multivibrator of said cyclically operating means upon going through a cycle of operation and being restored to its said first condition is held in said first condition again by said gating means and is released to go through another cycle of operation only if another reflection pulse occurring in response to the next transmitted sound pulse is again received during the interval demarcated by said gating means.

12. The system of claim 7 wherein said gating means includes two electron discharge tubes, each having at least control grid cathode and plate electrodes, a common load impedance for said plate electrodes of said two tubes, first means for applying a cutoff grid-cathode voltage to a first of said two tubes for each reflection pulse received by said receiving transducer, second circuit means being controlled by said circuit means for applying a cutoff grid-cathode voltage to the second of said two tubes for a variable interval for each cycle of operation of said binary circuit means to thereby permit said cyclically operating means to go into its cyclical operation only when the voltage at the plates of said two tubes is at the relatively high value it can attain only when both said tubes are simultaneously non-conductive.

13. The system of claim 12 wherein the grid-cathode circuit of said second tube includes a capacitor, said circuit means includes an output terminal whose voltage goes abruptly negative when said circuit means is operated from its second to its first condition, and circuit means connecting said output terminal to said capacitor to thereby drive said second tube abruptly to a cutoff condition when said binary circuit means restores itself to said first condition, and means for varying the discharge time constant of said capacitor to thereby control the duration of said time interval.

14. In a system for detecting the presence of vehicular traffic and being of the type wherein discrete sound pulses are transmitted across the path of the vehicles to be detected and receiving means is provided which selectively receives said pulses in accordance with whether said beam of pulses is intercepted by said vehicles and thereby provides a distinctive indication of the presence of said traffic, the improvement comprising, transmitting means for said sound pulses including a time base generator for generating gating voltage pulses at the frequency at which said sound pulses are desired to be transmitted and with each said gating voltage pulse being of short duration as compared to the interval between successive pulses, an oscillator controlled by each of said gating pulses and generating an ultrasonic frequency alternating-current signal pulse throughout the duration of each said gating voltage pulse, an amplifier for said signal pulses comprising an electron discharge tube having said signal pulses applied to its control grid and energizing said transmitting tranducers with its plate current, circuit means for normally biasing said tube to cutoff but being governed by said gating voltage pulse to cause said tube to become conductive only throughout its duration, and circuit means including a capacitor connected in parallel with the plate-cathode circuit of said tube and being charged relatively slowly to a high voltage throughout the interval between successive gating pulses when said tube is cut off, said capacitor being discharged rapidly through a short time constant discharge circuit including said plate-cathode circuit of said tube when said tube becomes conductive in response to said gating pulse, whereby substantially all of the energy required by said tube for amplifying the signal pulse applied to its control grid is obtained from said capacitor.

15. In a system for detecting the presence of vehicular traffic passing through either of at least two detection zones each of which is defined by a beam of repetitive energy pulses directed across the respective zone so as to impinge upon a vehicle passing therethrough, the combination comprising: a common transmitting means for both said zones generating repetitive pulses with a predetermined repetition rate, a plurality of transmitting transducers one for each said detection zone being electrically coupled to said transmitting means and each positioned and directed so as to transmit a respective beam of energy pulses across a corresponding one of said detection zones, a plurality of receiving transducers each associated with a respective detection zone and each positioned and directed so as to be responsive to the reflections of said energy pulses which are received from a vehicle in the respective detection zone, whereby each said receiving transducer receives a reflection of each transmitted energy pulse provided there is a vehicle occupying the respective detection zone but may instead receive reflections from more distant reflecting surfaces when no vehicle is in the respective detection zone, receiving means electrically coupled to each of said receiving transducers and producing an output pulse for each energy pulse impinging upon any of said receiving transducers, a single output means for both said receiving means, and gating means electrically coupled between said receiving means and said output means and supplying signals to said output means only for those reflection pulses impinging upon any of said receiving transducers throughout a predetermined time interval following the transmission of each said energy pulse, said predetermined time interval encompassing substantially only the maximum expected range of time of reception of a vehicle reflection pulse by any receiving transducer, said output means being responsive to the reception of an output signal from said gating means on each of at least a predetermined successive number of said predetermined time intervals to indicate the presence of a vehicle in at least one of said detection zones.

16. The system of claim 15 in which said receiving and transmitting transducers for each zone are both mounted over the roadway and are directed downwardly toward the pavement, said predetermined interval demarcated by said gating means including the expected reception times by any of said receiving transducers of reflection pulses from the top energy reflecting surfaces of both the highest and lowest vehicles likely to be encountered but excluding the expected reception time by any said receiving transducer of a reflection pulse from the pavement.

17. The system of claim 15 in which said receiving and transmitting transducers for each zone are both mounted alongside and directed across the roadway so as to impinge upon each vehicle passing along the roadway but so as to impinge also upon vehicles and fixed objects beyond said roadway, said predetermined interval demarcated by said gating means including the expected reception times by any of said receiving transducers of reflection pulses from the near side reflecting surface of any vehicle passing through any of the respective detection zones but excluding the expected reception time by any of said receiving means of a reflection pulse by any said receiving transducer from any of said more distant vehicles and fixed objects.

18. In a system for detecting the presence of vehicular traffic passing through either of at least two detection zones, each of which is defined by a beam of repetitive energy pulses directed across the respective zone so as to impinge upon a vehicle passing therethrough, the combination comprising: a common transmitting means for both said zones generating repetitive pulses with a predetermined repetition rate, a plurality of transmitting transducers one for each said detection zone being electrically coupled to said transmitting means and each being positioned and directed so as to transmit a respective beam of energy pulses across the corresponding detection zone, a plurality of receiving transducers each associated with a respective detection zone and being positioned and directed so as to be responsive to the reflections of said energy pulses which are received from a vehicle in the respective detection zone, a common receiving means electrically coupled to each of said receiving transducers and producing an output pulse for each energy pulse impinging upon any of said receiving transducers, output means, and gating means electrically coupled between said receiving means and said output means and supplying a signal to said output means only for those reflection pulses impinging upon any of said receiving transducers throughout a predetermined time interval following the transmission of each said energy pulse, said output means including means which is responsive to only a single signal from said gating means occurring during any one predetermined time interval even though said gating means may produce a plurality of said signals during any said predetermined time interval in response to different reflections received by the several receiving transducers, and also including means for indicating the presence of vehicular traffic in at least one of said detection zones when said responsive means has been operated at least a predetermined number of times within a predetermined interval.

References Cited by the Examiner

UNITED STATES PATENTS

| | | | |
|---|---|---|---|
| 2,622,140 | 12/52 | Muller | 340—38 |
| 2,685,680 | 8/54 | Williams | 340—38 |
| 2,695,378 | 11/54 | Irvin | 317—149 |
| 2,781,479 | 2/57 | Rice | 317—149 |
| 3,046,519 | 7/62 | Polster | 340—38 |
| 3,046,520 | 7/62 | Polster | 340—38 |

NEIL C. READ, *Primary Examiner.*

BENNETT G. MILLER, THOMAS B. HABECKER,
*Examiners.*